United States Patent
Sanger

Patent Number: 6,148,622
Date of Patent: Nov. 21, 2000

[54] ENVIRONMENTAL CONTROL SYSTEM NO CONDENSER HIGH PRESSURE WATER SEPARATION SYSTEM

[75] Inventor: Roger Reed Sanger, Fountain Valley, Calif.

[73] Assignee: AlliedSignal Inc., Morristown, N.J.

[21] Appl. No.: 09/274,934

[22] Filed: Mar. 23, 1999

Related U.S. Application Data

[60] Provisional application No. 60/080,673, Mar. 3, 1998.

[51] Int. Cl.$^7$ .................................................. F25B 9/00
[52] U.S. Cl. .............................................. 62/88; 62/402
[58] Field of Search ........................... 62/402, 88, 87, 62/172

[56] References Cited

U.S. PATENT DOCUMENTS

| | | |
|---|---|---|
| Re. 32,100 | 4/1986 | Rannenberg . |
| 4,198,830 | 4/1980 | Campbell . |
| 4,430,867 | 2/1984 | Warner . |
| 4,963,174 | 10/1990 | Payne . |
| 4,966,005 | 10/1990 | Cowell et al. . |
| 4,967,565 | 11/1990 | Thomson et al. . |
| 5,086,622 | 2/1992 | Warner ........................................ 62/88 |
| 5,461,882 | 10/1995 | Zywiak .................... 62/402 X |
| 5,704,218 | 1/1998 | Christians et al. .................... 62/402 X |
| 5,860,283 | 1/1999 | Coleman et al. ............................ 62/87 |
| 5,887,445 | 3/1999 | Murry et al. .............................. 62/402 |
| 5,906,111 | 3/1999 | Lui ............................................ 62/402 |

FOREIGN PATENT DOCUMENTS

| | | |
|---|---|---|
| 2027874 | 2/1980 | United Kingdom . |
| WO 91/00483 | 1/1991 | WIPO . |
| WO 92/0338 | 3/1992 | WIPO . |

*Primary Examiner*—William Doerrler
*Assistant Examiner*—Chen-Wen Jiang
*Attorney, Agent, or Firm*—William J. Zak, Jr. Esq.

[57] ABSTRACT

An air cycle environmental control system for high pressure water separation omits a condenser heat exchanger and includes a reheater capable of placing compressed air in a heat exchange process to condense water vapor. A first turbine is in direct flow communication with the reheater, while the first turbine is capable of condensing water vapor from the compressed air. A water extractor is in flow communication with the first turbine and the reheater, while a second turbine is downstream of the reheater. The second turbine is capable of cooling a reheated, dehumidified air from the reheater to produce a conditioned air for supply to an enclosure. A method of water separation from a high pressure water vapor bearing air omits a step of condensing water vapor in a condenser heat exchanger and includes the steps of cooling a compressed air in a reheater heat exchanger such that the compressed air becomes a cold air. Water vapor is then condensed from the cold air to become a dehumidified air. Thereafter, a step of absorbing a heat of sensible cooling and condensation in the reheater occurs. Finally, a reheated air from the reheater undergoes expansion by a second turbine for eventual supply to the enclosure.

21 Claims, 1 Drawing Sheet

ENVIRONMENTAL CONTROL SYSTEM NO CONDENSER HIGH PRESSURE WATER SEPARATION SYSTEM

CROSS REFERENCE TO RELATED APPLICATIONS

The present application claims the benefit of U.S. Provisional Application No. 60/080,673, filed Mar. 3, 1998.

BACKGROUND OF THE INVENTION

The present invention generally relates to air cycle Environmental Control Systems (ECSs). More specifically, the invention relates to an improved air cycle ECS and improved method of conditioning water vapor compressed air by omitting the use of a condenser to condense water vapor while still increasing efficiency and lowering production costs.

ECSs are used to provide a supply of conditioned air to an enclosure, such as an aircraft cabin and cockpit. In the past, an air cycle ECS has typically operated on a flow of bleed air taken from an intermediate or high pressure stage within a jet engine having multi-compression stages. The bleed air has usually been pre-cooled within a primary heat exchanger with heat being dumped to RAM air and then flowed to a compressor. After compression, the air has been routed through a series of heat exchangers, including a reheater and a condenser. Then, the air has typically been expanded by a turbine which is mechanically engaged to the compressor. Finally, the air can be sent to the cabin.

Past air cycle ECS designs have included 3 wheel and 4 wheel bootstrap, high pressure water separation cycles. The 3 wheel and 4 wheel designs utilize a reheater and a condenser heat exchanger to respectively pre-cool the bleed air and then condense the moisture in the air. After condensation, the condensed water is removed by a water extractor. The resulting dehumidified air flows to the reheater to recover energy and then to a turbine for expansion and consequent cooling. The expanded air from the turbine can then be used to cool and condense water in the condenser heat exchanger. For the 3 wheel system, the expanded air which has been warmed in the condenser can then be directly supplied to a cabin. In the 4 wheel design, the expanded air which has been warmed in the condenser is then further expanded by another turbine for eventual supply to the cabin.

While the past 3 wheel and 4 wheel bootstrap systems have been useful, unsatisfied needs still remain. For example, size constraints continue to call for smaller systems. Obviously, the smaller the ECS, the more cooling capacity can be provided within a given system space. And with a smaller ECS, there are a greater number of opportunities that the ECS can be used as a retrofit. As another example, system reliability means lower maintenance costs. Greater reliability of the ECS can be achieved by requiring fewer components in the ECS, since there will be fewer components which can fail. Furthermore, with fewer system components, the overall cost of the system will decrease. Yet another example of an unmet need is system efficiency. If energy is being wasted by parasitic losses to system components, fewer components means less waste and greater efficiency.

As can be seen, there is a need for an improved air cycle ECS and improved method of conditioning high pressure water vapor bearing air which eliminates system components typically used in past systems. There is also a need for such improved systems and methods which reduce the overall system size and, in turn, improve reliability and efficiency, in addition to lowering the system cost.

SUMMARY OF THE INVENTION

An air cycle environmental control system for high pressure water separation omits the need for a condenser heat exchanger and comprises a reheater capable of cooling water vapor from compressed air; a first turbine directly downstream of and in direct flow communication with the reheater, with the first turbine being capable of condensing water vapor from the compressed air; and a second turbine downstream of and in flow communication with the first turbine.

A method of water separation from a high pressure water vapor bearing air that omits the step of condensing water vapor in a condenser heat exchanger comprises the steps of cooling compressed air in a reheater where water vapor may be partially condensed, with the step of cooling producing a compressed, cold air; directly flowing the compressed, cold air from the reheater to a first turbine; and recovering a heat of sensible cooling and a heat of condensation in the reheater to increase the energy load and cooling power of a second turbine. A method is also provided for reheating the air prior to expansion into a second turbine so as to evaporate any residual water and present the second turbine with dry superheated air that can then be expanded without risk of water ice formation in the turbine.

These and other features, aspects and advantages of the present invention will become better understood with reference to the following drawings, description and claims.

DETAILED DESCRIPTION OF THE INVENTION

Figure 1:
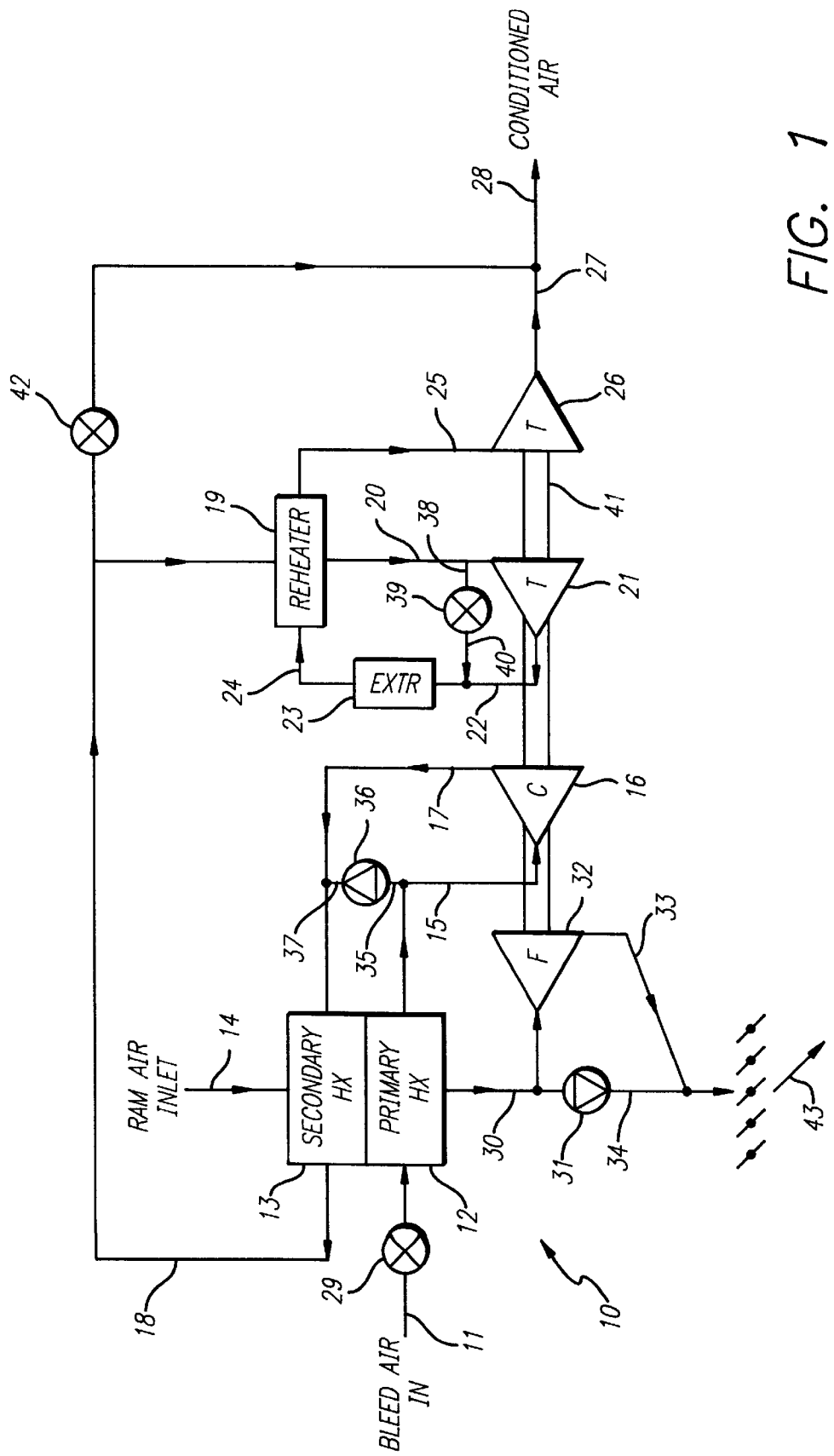
FIG. 1 is a schematic diagram of an environmental control system according to an embodiment of the present invention.

FIG. 1 schematically shows an air cycle, 4 wheel environmental control system 10 according to the present invention. The system 10 generally operates by receiving a bleed air 11 to be conditioned for eventual supply to an enclosure, such as the cabin of an aircraft. The conditioning of the air 11 includes removing water vapor and lowering the temperature. In the context an aircraft, the bleed air 11 comes from a turbine engine, is precooled by RAM air 14 in a primary heat exchanger 12, and then compressed by a compressor 16. Next, the compressed air is cooled in a secondary heat exchanger 13 and a reheater 19, with initial vapor condensation occurring therein. Thereafter, most of the remaining water vapor is condensed in a first turbine 21. The air is then returned to the reheater 19, expanded by a second turbine 26, and then exits as a conditioned air or supply 28 to the cabin of the aircraft. However, even though the present invention is described in the context of an aircraft, it is contemplated that other environments can incorporate the system 10, such as ground transportation requiring cooled and filtered air.

In more particularly describing a preferred embodiment of the present invention, the volume of bleed air 11 which flows into the primary heat exchanger 12 is controlled by a valve 29. The primary heat exchanger 12 pre-cools the bleed air 11 by placing in heat exchange relationship a source of RAM or ambient air 14 and the bleed air 11. A fan 32 pulls the RAM air 14 from the primary heat exchanger 12 and through a duct 30. In the flow of the duct 30 is a check valve 31 which controls the RAM air 14 moving either through the fan 32 or directly out of the system 10, via a duct 34, as an exit air 43. For example, an operator may not want all of the RAM air 14 drawn through the fan 32 because, in flight, the RAM air 14 pressure is sufficient to provide the necessary air flow through the secondary heat exchanger 13 and the primary heat exchanger 12. Also, the fan 32 would draw excessive power from the cooling turbines 21, 26. If the RAM air 14 flows through the fan 32, the flow exits the fan 32 via a duct 33 and becomes the exit air 43.

A pre-cooled air from the primary heat exchanger 12 passes into a duct 15. The pre-cooled air can then enter a compressor 16 to compress the pre-cooled air to a high pressure. Alternatively, the pre-cooled air can enter a duct 35 which leads to a check valve 36 for bypassing the compressor 16. In the compressor 16, the amount of compression can vary depending upon the particular environment for the system 10, although it is contemplated that the pressure range for this embodiment of the invention is about 2 to 1. Thereby, a compressed or high pressure, pre-cooled air exits the compressor 16, flows through a duct 17 and enters a secondary heat exchanger 13. On the other hand, if the pre-cooled air from the primary heat exchanger 12 bypasses the compressor 16 through the check valve 36, for example, during high altitude and low engine pressure conditions whereby cooling is provided by RAM cooled heat exchange, then the flow exits the valve 36 through a duct 37, and reconnects with the duct 17.

The secondary heat exchanger 13 receives the flow from the duct 17 and can further cool the high pressure or compressed, pre-cooled air by placing it in heat exchange relationship with the RAM air 14. Consequently, some water vapor condensation occurs in the secondary heat exchanger 13, with the amount being dependent upon the ambient humidity. In this particular embodiment, the amount of condensation in the secondary heat exchanger 13 is about 0 to 10% of the total water vapor content in the bleed air 11, with more condensation occurring at higher ambient humidity. Upon such condensation and cooling, a high pressure or compressed, cooled air exits the secondary heat exchanger 13 and enters a duct 18. Through the duct 18, the compressed air can continue to either a valve 42 or the reheater 19. The valve 42 is a temperature control and heat exchange cooling valve which can be controlled by an operator or control system (not shown). If, for example, the supply air 28 from the system 10 is too cold, the compressed air from the secondary heat exchanger 13 can be added directly to the supply 28 to warm the latter.

If the compressed, cooled air flows through the reheater 19, the air is further cooled as a result of a heat exchange process between the compressed, cooled air and a dehumidified, cold air which is further described below. With the compressed air being further cooled in the reheater 19, additional water vapor condensation can occur. Thus, for example, in this particular embodiment, about 0 to 50% of the total water vapor content in the bleed air 11 is condensed in the reheater 19. Of course, the amount of condensation can vary with the ambient humidity, with more condensation occurring with higher humidity.

From the reheater 19, a compressed, cold air flows through a duct 20 and either into a duct 38 or directly into a first turbine 21. As can be seen, when the cold air flows directly to the first turbine 21, it does so in the substantial absence of further water vapor condensation. The absence of further water vapor condensation is the result of an absence of a condenser intermediate the reheater 19 and the first turbine 21. With the presence of a condenser, as in the prior art, flow from the reheater 19 to the first turbine 21 may be considered as indirect.

When the flow moves through the first turbine 21, the flow is expanded to provide a first expanded air which can exit the first turbine 21 via a duct 22. By expansion, the compressed air is cooled to cause an amount of water vapor condensation which, in this embodiment, is about 30 to 100% of the total water vapor content in the bleed air 11. Again, the amount of condensation can vary with the particular environment, with a greater percentage of condensation occurring in the first turbine 21 with lower ambient humidity. For the embodiment shown in FIG. 1, it can be seen that a majority or substantially all of the required water vapor condensation occurs in the reheater 19 and/or the first turbine 21, as opposed to in the typical reheater and/or condenser heat exchangers used in prior air cycle ECS designs. More specifically, for increasingly higher humidity conditions, more condensation occurs in the secondary heat exchanger 13 and the reheater 19. On the other hand, for increasingly lower humidity conditions, more condensation occurs in the first turbine 21. By way of example, if the ambient humidity is about 133 gr/lb, then the preferred embodiment shown in FIG. 1 contemplates that about 10% of the total water vapor is condensed in the secondary heat exchanger 13, about 50% in the reheater 19, and about 30% in the first turbine 21.

However, since the first turbine 21 may tend to lower the air temperature in the expansion process below the freezing temperature of the water in the compressed air flow, some of the flow to the first turbine 21 can be bypassed via the duct 38 and through a low limit valve 39. The valve 39 serves to raise the temperature of the first expanded air exiting the first turbine 21 if such temperature is below freezing. That temperature condition may exist at off design conditions where cycle performance exceeds design requirements.

The first expanded air from the first turbine 21 enters a water extractor 23 which extracts the condensed water vapor. Although not shown in FIG. 1, the condensed water vapor may then be used, for example, as an additional coolant medium for the secondary heat exchanger 13. In such instance, the condensed water vapor can be sprayed into the RAM air 14 which enters the secondary heat exchanger 13. The sprayed condensate provides an additional evaporation of water in the secondary heat exchanger 13 which, in turn, effectively reduces the temperature of any outlet flow from the secondary heat exchanger 13. Irrespective of whether the condensate is used as above described, the water extractor 23 produces a dehumidified air which can have varying amounts of water vapor, depending upon the requirements of the enclosure to be conditioned, the operating conditions, and the design of the system 10. For this embodiment of the invention, it is contemplated that the water vapor content of the dehumidified air may be low enough so that after the heat exchange in the reheater 19 and in the rest of the cycle, the air will remain dry with essentially no liquid condensate. The dehumidified air moves from the extractor 23 through a duct 24 and back to the reheater 19.

In the reheater 19, the dehumidified air acts as a coolant medium when it is placed in heat exchange relationship with the compressed air coming from the secondary heat exchanger 13. Through that heat exchange process, the dehumidified air can absorb or recover upwards of about 50–90% of the heat of sensible cooling and heat of condensation removed from the compressed air. The amount of recovery varies, depending upon the ambient humidity. In any event, the dehumidified air is warmed in the reheater 19 and exits therefrom as a reheated air. That reheated air can then flow through a duct 25 and into a second turbine 26. The second turbine 26 expands the reheated air to produce a second expanded air which exits through a duct 27 and becomes the supply or conditioned air 28.

Additionally, the second turbine 26 can exploit some of the heat of sensible cooling and condensation which was absorbed by the reheater 19 and convert that heat into useful work. As can be seen in FIG. 1, the second turbine 26 is mechanically engaged, via a shaft 41, to the first turbine 21, the compressor 16, and the fan 32. When the second turbine 26 expands the reheated air, the temperature decrease and the mechanical energy generated in the second turbine 26 are proportional to its inlet temperature level. As that level is raised by the heat recovery in the reheater 19, more power and cooling are generated. That recovery can mean that the rotation of the first and second turbines 21, 26 are increased. With increased turbine 21, 26 rotation, higher compression from the compressor 16 can be achieved, as well as increased rotation of the fan 32. Further, increased turbine 21, 26 rotation can mean greater cooling of the air to be conditioned.

As can be appreciated by those skilled in the art, the ECS 10 omits the need for a condenser heat exchanger which has been commonly employed in past designs to condense water vapor. Instead, the ECS 10 employs the secondary heat exchanger 13, the reheater 19, and the first turbine 21 to carry out the condensing step. Thus, it can be seen that the ECS 10 has removed the need for a component while utilizing the typically existing components to perform the function of that removed component. The result is a smaller sized ECS, a more reliable system due to fewer components, a more efficient system due to less components contributing to parasitic heat and pressure losses, and a less costly system.

It should be understood, of course, that the foregoing relates to preferred embodiments of the invention and that modifications may be made without departing from the spirit and scope of the invention as set forth in the following claims.

What is claimed is:

1. A method for conditioning water-vapor bearing compressed air for supply as conditioned air to an enclosure, comprising the steps of:
   cooling said compressed air in a secondary heat exchanger such that said water vapor may be condensed, the step of cooling said compressed air producing a compressed, cooled air;
   cooling said compressed, cooled air in a reheater such that said water vapor may be condensed, the step of cooling said compressed, cooled air producing a cold air;
   cooling said cold air in a first turbine such that said water vapor may be condensed, the step of cooling said cold air occurring directly after the step of cooling said compressed, cooled air; and
   extracting condensed water vapor in a water extractor downstream of said first turbine and upstream of said reheater.

2. The method of claim 1, further comprising the step of absorbing a heat of sensible cooling and a heat of condensation in said reheater.

3. The method of claim 1, further comprising the step of recovering a heat of sensible cooling and a heat of condensation in a second turbine downstream of said reheater.

4. The method of claim 1, wherein about 30–100% of the total water vapor in said compressed air is condensed in said reheater and first turbine.

5. The method of claim 1, wherein about 30% of all of said water vapor in said compressed air is condensed in said first turbine.

6. The method of claim 1, further comprising the step of directly flowing said cold air from said reheater and to said first turbine.

7. The method of claim 6, wherein the step of directly flowing occurs in the absence of passing said cold air through a condenser disposed intermediate said reheater and first turbine.

8. An air cycle environmental control system for conditioning water vapor bearing compressed air for supply to an enclosure as conditioned air, comprising:
   a reheater capable of condensing water vapor from said compressed air;
   a first turbine directly downstream of and in direct flow communication with said reheater, said first turbine being capable of condensing water vapor from said compressed air;
   a water extractor intermediate said first turbine and reheater: and
   a second turbine downstream of and in flow communication with said first turbine and reheater.

9. The system of claim 8, further comprising a secondary heat exchanger upstream of said reheater, said secondary heat exchanger being capable of condensing said water vapor.

10. The system of claim 8, wherein said reheater is intermediate said first and second turbines.

11. The system of claim 8, wherein said reheater is capable of placing in heat exchange relationship said compressed air and a dehumidified air.

12. The system of claim 8, wherein said reheater is capable of absorbing a heat of sensible cooling and a heat of condensation from said compressed air.

13. The system of claim 12, wherein said second turbine is capable of recovering at least a portion of said heat of sensible cooling and heat of condensation.

14. The system of claim 8, wherein said first and second turbines are mechanically engaged to one another.

15. An air cycle environmental control system for conditioning water vapor bearing compressed air for supply to an enclosure as conditioned air, comprising:
   a secondary heat exchanger capable of condensing said water vapor;
   a reheater downstream of said secondary heat exchanger and capable of condensing said water vapor;
   a first turbine directly downstream of said reheater and capable of condensing said water vapor;
   a water extractor intermediate said first turbine and reheater; and
   a second turbine downstream of said first turbine and reheater, said second turbine capable of recovering a heat of sensible cooling and heat of condensation absorbed in said reheater.

16. The system of claim 15, wherein said secondary heat exchanger is capable of condensing about 0 to 10% of said water vapor in said compressed air.

17. The system of claim 15, wherein said reheater is capable of placing said compressed air in heat exchange relationship with a dehumidified air.

18. The system of claim 15, wherein said reheater is capable of condensing about 0 to about 50% of said water vapor in said compressed air.

19. The system of claim 15, further comprising a fan and a compressor, both of which are mechanically engaged to said first and second turbines.

20. An air cycle environmental control system for conditioning water vapor bearing compressed air for supply to an enclosure as conditioned air, comprising:

a secondary heat exchanger capable of condensing said water vapor;

a reheater downstream of said secondary heat exchanger and capable of condensing said water vapor;

a first turbine directly downstream of said reheater and capable of condensing about 30 to about 100% of said water vapor in said compressed air; and a second turbine downstream of said first turbine and reheater, said second turbine capable of recovering a heat of sensible cooling and heat of condensation absorbed in said reheater.

21. The system of claim 20, further comprising a water extractor intermediate said first turbine and reheater.

* * * * *